Nov. 11, 1941.  T. C. FANSHIER  2,262,637
MOTOR DRIVEN FISHING REEL
Filed June 5, 1939  2 Sheets-Sheet 1

Thomas C. Fanshier
INVENTOR.
BY
ATTORNEYS.

Nov. 11, 1941.  T. C. FANSHIER  2,262,637
MOTOR DRIVEN FISHING REEL
Filed June 5, 1939  2 Sheets-Sheet 2
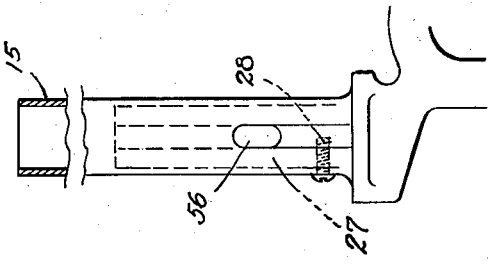
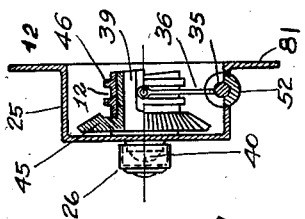
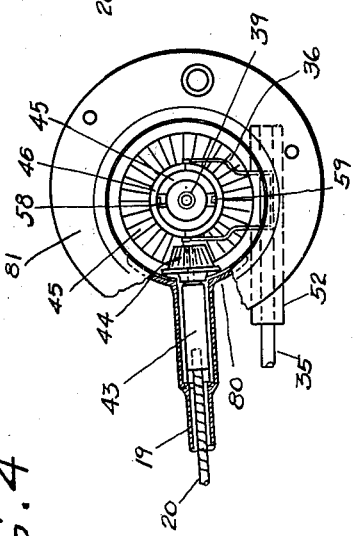
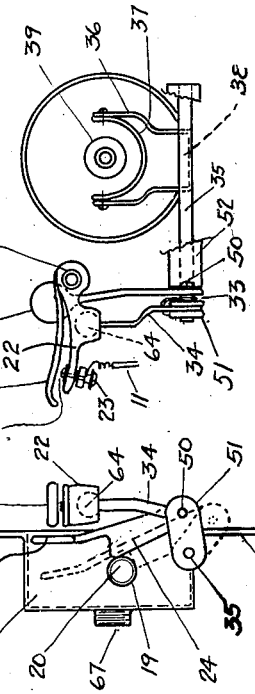
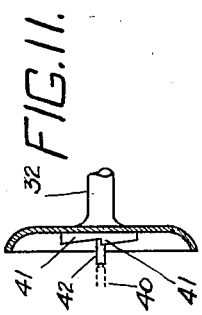
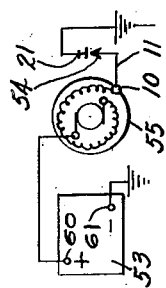
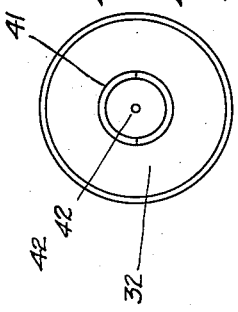
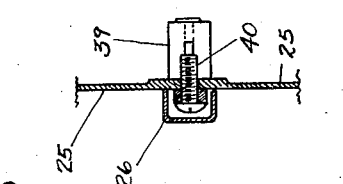
Thomas C. Fanshier
INVENTOR.
BY
ATTORNEYS.

Patented Nov. 11, 1941

2,262,637

UNITED STATES PATENT OFFICE 2,262,637

MOTOR DRIVEN FISHING REEL

Thomas C. Fanshier, Oklahoma City, Okla.

Application June 5, 1939, Serial No. 277,385

5 Claims. (Cl. 43—21)

This invention relates to a motor driven fishing reel, and to a motor drive attachment for mounting on an ordinary fishing rod for driving an ordinary fishing reel.

The present invention is an improvement over the invention covered by my pending application Serial No. 268,299, filed April 17, 1939, and has similar objects.

The details in the construction of the preferred improvements in this invention, together with other objects attending its production, will be better understood when read in connection with the accompanying drawings which are chosen for illustrative purposes only, and in which:

Figure 3 is an end view of the reel spool.

Figure 4 is an inside end view of the gear case, and shows the relative arrangement of the driving gears and clutch yoke.

Figure 5 is a sectional view of the gearcase, and a partial sectional view of the ringgear and the clutch collar.

Figure 6 is a view showing the manner of mounting the shaft on which the ring gear rotates, the wall of the gear case being shown in section.

Figure 7 is a side view of the gear case showing the manner of mounting the combination motor switch and clutch control mechanism.

Figure 8 is a front view of that portion of the invention illustrated in Figure 7.

Figure 9 is a side view showing the manner of mounting a steel tube on the handle shaft of an ordinary fishing rod to facilitate installation of the motor and flexible drive shaft which form a part of the invention.

Figure 10 is an electrical diagram of the motor circuit.

Figure 11 is a side view partially in section of one end of the reel spool.

Like characters of reference designate like parts in all the figures.

Figure 1:
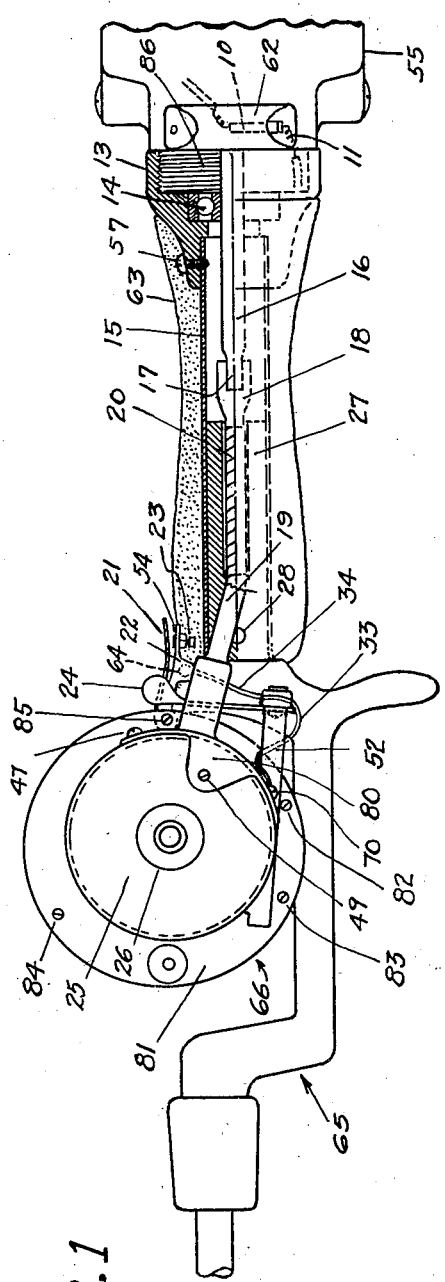
Figure 1 is a side elevation, partially in section, of a motor driven reel embodying the invention, and illustrates particularly the driving connection between the motor and reel.

Referring to the drawings, I contemplate the use of a small, direct current motor for the power. Alternating current motors will be used where A. C. current is available; i. e., in large fishing boats and fishing wharfs.

In the drawings, the numeral 55 designates an electric motor of usual construction, preferably series wound D. C. so that it can be operated by a storage battery 53 (Fig. 10).

Referring particularly to Figure 1, the motor shaft is designated 16, and is squared at its end 17, to fit into a square socket formed in one end of a connector 18, the other end of which is centrally bored to receive one end of a flexible drive shaft 20, this end of the drive shaft being soldered, welded, or otherwise securely anchored therein.

The flexible drive shaft 20 rotates inside a tubular housing 19 and its opposite end is suitably secured within a recess in one end of a stub shaft 43, as shown in Figure 4. As shown, the major portion of the shaft 43 is journaled in a journal bracket 80 which is secured to the exterior wall of a gear case 25 by means of screws 47, 49 and 70. A pinion gear 44 is suitably secured to the opposite end of the shaft 43 in a position to mesh with a bevel gear 45 (Figs. 2, 4 and 5), which bevel gear is rotatably mounted within the gear case 25 on a stub shaft 39 which is in alignment with the rotational axis of a reel spool 32. This shaft 39 is mounted on the gear case wall by means of a screw 40, the head of which is normally protected by a housing 26 (Fig. 6) which screws onto a threaded neck 67 (Fig. 7) of the gear case 25. The inner end of the shaft 39 is provided with a reduced bore which serves to journal one end of a spindle shaft 42 on which the reel spool 32 rotates. The end of the screw 40 is reduced in diameter to enter the reduced bore in the shaft 39, as shown in Figure 6, so that the screw may be tightened to prevent end play of the spindle 42.

The elongated hub of bevel gear 45 is in the form of a cylindrical sleeve (see Fig. 5) and is provided exteriorly with a plurality of longitudinally extending slots or grooves 58 (Fig. 4) for slidably receiving complementally shaped and spaced pins or tongues 59 carried internally by a clutch collar 46, the grooves and tongues co-operatively forming a sliding spline connection between the bevel gear 45 and the collar 46. The collar 46 is provided externally with a circumferential groove 12 as shown in Figure 5. A throw-out collar 37 (Fig. 8), is held in position in the annular groove 12 of the collar 46 by the spaced arms of a yoke 36, the opposite end of which is removably seated in a slot 38 milled longitudinally in a throw-out collar shaft 35. This shaft 35 is journaled in a substantially cylindrical housing 52, the intermediate portion of which passes through and openly communicates with the interior of the gear case 25. This housing is rigidly secured to the gear case wall, as by spot welding.

The yoke 36, being seated in the slot 38 is naturally forced to oscillate as the shaft 35 is oscillated. The yoke 36 and its throw-out collar 37 thus serve to move the clutch collar 46 back and forth along the elongated hub of the bevel gear 45. The adjacent end of the reel spool 32 is provided with a ring of radially extending ratchet teeth 41, (Fig. 11) and the end of the clutch collar 46 is provided with a complemental ring of ratchet teeth (Fig. 5). Since the collar 46 is slidably splined on the hub of gear 45, this collar 46 serves as a means for selectively transmitting rotary motion from the gear 45 to the reel spool 32.

Figure 2:
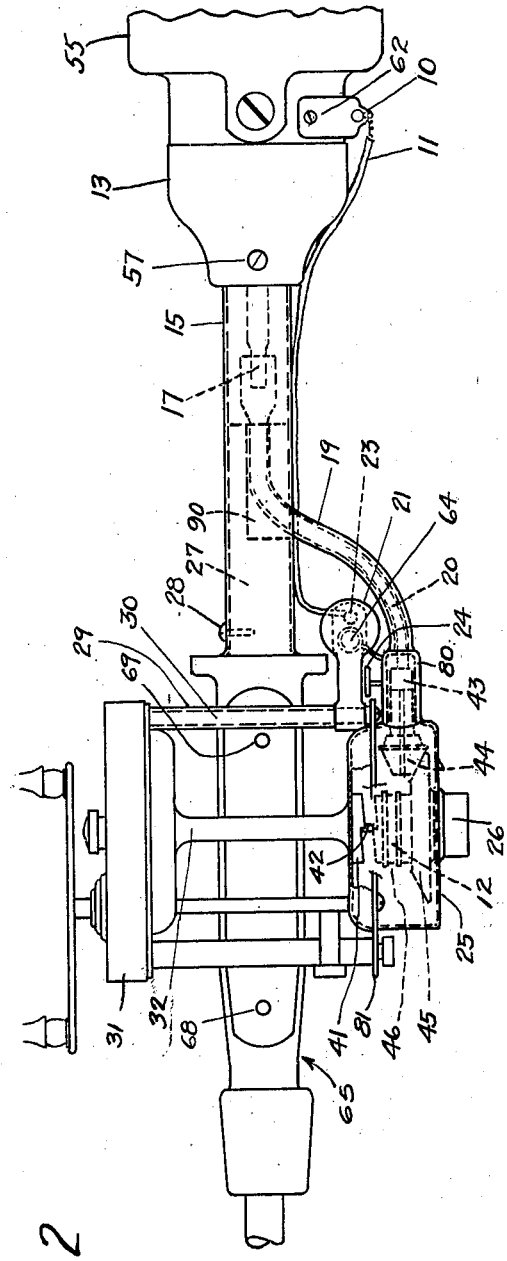
Figure 2 is a plan view of the motor driven reel illustrated in Figure 1, with parts dotted in to show constructional details and arrangement.

Referring now more particularly to Figures 7 and 8, it will be seen that I provide a thumb operated combination motor switch and clutch operating lever, comprising a thumb plate 21 and lever 22, arranged one above the other, with one adjacent end of each pivotally mounted on a shaft or rod 30, which shaft may also serve as one of the brace rods for the reel, as shown in Figure 2. A spacing sleeve 29 is provided for this brace rod. The free end of the lever 22 carries a switch contact element 54, which is, of course, suitably insulated from the lever 22. The intermediate portion of the lever 22 is pivotally connected by means of a ball and socket joint 64 to one end of an arm 34, the opposite end of which is pivotally connected substantially at right angles to one end of a link 51 by means of a pin 50. The other end of the link 51 is rigidly secured to that end of the shaft 35 which protrudes from the journal housing 52 (Fig. 8). The pin 50 also pivotally mounts one end of a thumb released clutch locking lever 24, the function of which will be more clearly explained hereinafter.

From the description thus far it will be understood that when downward pressure is applied on the thumb plate 21, the plate pivots about its axis 30, contacts the contact element 54 and closes the electrical circuit to the motor, as will be more fully described. The motor, through the flexible shaft 20 rotates the gear 44 which in turn rotates the bevel gear 45. Further downward pressure on the thumb plate 21 pivots the lever 22 about its axis 30 and forces the arm 34 to move longitudinally downward. This movement of the arm 34 forces the link 51 to pivot about its axis and to thus partially rotate the shaft 35 to which the link 51 is rigidly attached (see dotted line positions in Fig. 7). The shaft 35, in turn, moves the yoke 36, and causes the throw-out collar 37 to engage the side wall of the annular groove 12 in rotating clutch collar 46, and to move that collar longitudinally a sufficient distance that the teeth on its end engage the teeth 41 on the end of the reel spool 32.

When the various members which go to make up the selective clutch control mechanism reach the respective positions just mentioned, a slight pressure of the thumb against the free end of the locking lever 24 moves the lever into the position shown by dotted lines in Fig. 7, in which position the dog formed along one side edge of this lever moves beneath the cylindrical portion of the rigidly positioned journal bracket 80, and this bracket serves as a stop to prevent the free return of the various members of the clutch control mechanism to their normal positions.

When the lever 24 is manually moved away from its contact with the bracket 80, the various clutch control members are freed to return to the positions shown by the solid lines in Figures 7 and 8, under the tension of a spring 33 which is coiled around a portion of the housing 52 (Fig. 1). One end of this spring is rigidly held between one flange of the journal bracket 80 and the nether surface of the screw head 70, while the opposite end of this spring extends outward from the longitudinal axis 35 of the spring and preferably encircles, or at least bears against the pin 50 (Figs. 7 and 8).

Figures 1 and 2 illustrate the manner of installing the invention thus far described on the handle of an ordinary fishing rod, designated as a whole by the numeral 65, as well as the manner of adapting an ordinary reel 66 for power operation by this invention. The numeral 31 designates a gear case which is, of course, usual on a manually driven reel, and 81 designates the end plate at the opposite end of the reel. A circular hole is cut in this end plate 81 and the gear case 25 is welded to the outside of the plate 81, as shown in Figure 5. The reel is mounted on the fishing rod 65 by any suitable means, as by the screws 68 and 69.

An ordinary fishing rod handle includes a stub shaft 27. To mount the motor on this stub shaft I employ a steel tube or sleeve 15, either pressed on or otherwise rigidly secured on the shaft 27, as by set screws 28. One end of the motor housing is threaded, as at 86, to fit an adapter 13 which includes a seat for one bearing race 14 for the motor shaft 16. Set screws 57 are employed to rigidly secure the adapter in position on the end of the sleeve 15.

A perforation 56 (Fig. 9) is provided in the wall of sleeve 15, and the stub shaft 27 is milled out as indicated by the dotted line 90 in Figure 2. The perforation 56 is located directly over one end of this milled out recess 90 in the shaft 27 thus affording an entrance for the tubular housing 19 and the enclosed flexible shaft 20. A suitable handle covering 63, of cork or other composition encloses the shaft 27, the tube 15, and a portion of the adapter 13. A perforation is also provided in this covering 63 for the housing 19.

As for the motor circuit, the wiring diagram of Figure 10 discloses a preferred electrical hookup. A battery 53 has one of its terminals 60 grounded to the motor housing, as shown, while its other terminal 61 is connected direct to one of the motor brushes. From this brush the current passes thru the motor commutator to the other brush and into one end of the motor's field coil. The other end of the field coil is connected to a terminal 10 which is insulated from the motor housing by being mounted on a plate 62 of non-conductive material. The terminal 10 is preferably in the form of a jack, as shown. This terminal 10 is connected by means of an insulated conductor 11, which runs beneath the composition handle covering 63, to one switch contact element 54, through the insulated connector bolt 23. The other switch contact element 21 is grounded, thus completing the circuit when contact element 21 is pressed against contact element 54.

I claim:

1. A power drive for the reel spool of a fishing rod and reel comprising: an electric motor mounted on the rod, the motor case forming the rod handle, the motor shaft lying substantially at right angles to the rotational axis of the reel; a bevel gear rotatably mounted on the reel shaft in axial alignment with the reel spool, and rotatable independently with relation thereto; a flexible shaft affording a driving connection between said motor and said bevel gear; and clutch means affording a selective driving connection between said bevel gear and said reel spool.

2. A power drive for the reel spool of a fishing rod and reel comprising: an electric motor mounted on the rod in proximity to the reel; a bevel gear rotatably mounted on the reel shaft in axial alignment with the reel spool and rotatable independently with relation thereto; a flexible shaft affording a driving connection between said motor and said bevel gear; clutch means affording a selective driving connection between said bevel gear and said reel spool; and means for selectively operating said clutch means.

3. A power drive for the reel spool of a fishing rod and reel comprising: an electric motor mounted on the rod in proximity to the reel; a bevel gear rotatably mounted on the reel shaft in axial alignment with the reel spool and rotatable independently with relation thereto; means including a bevel pinion gear and a flexible shaft affording a direct driving connection between said motor and said bevel gear; an axially slidable concentric collar splined on the hub of said bevel gear and adapted to serve as a means for selectively transmitting rotary motion from said bevel gear to said reel spool; and means for axially moving said collar in either direction along the hub of said bevel gear during the rotation of both the collar and gear.

4. A power drive for the reel spool of a fishing rod and reel comprising: an electric motor mounted on the rod and forming the handle thereof, the motor shaft lying substantially at right angles to the rotational axis of the reel; a bevel gear rotatably mounted on the reel shaft in axial alignment with the reel spool and rotatable independently with relation thereto; a concentric clutch collar slidably splined on the hub of said bevel gear to rotate therewith regardless of the relative axial position of the collar; co-operatively engageable teeth on the adjacent ends of the clutch collar and reel spool; a pinion gear rotatably mounted to mesh with said bevel gear; a flexible shaft directly connecting between said motor and said pinion gear; and means for selectively sliding said clutch collar along its rotational axis in either direction to engage or disengage its teeth from the teeth on said reel spool.

5. A power drive for the reel spool of a fishing rod and reel comprising: an electric motor mounted on the rod with its shaft lying substantially at right angles to the rotational axis of the reel; a bevel gear rotatably mounted on the reel shaft in axial alignment with the reel spool; a concentric clutch collar slidably splined on the hub of said bevel gear to rotate therewith regardless of the relative axial position of the collar; co-operatively engageable teeth on the adjacent ends of the clutch collar and reel spool; a pinion gear rotatably mounted to mesh with said bevel gear; a flexible driving shaft directly connecting said motor and said pinion gear; a source of electric power for said motor; and combination means for selectively connecting said source of power to said motor and for successively moving said clutch collar in either direction along its rotational axis to engage or disengage its teeth from the teeth on said reel spool.

THOMAS C. FANSHIER.